J. D. PIERCE.

Assignor, by mesne assignments, to SHIELDS & BROWN.

COVERING FOR STEAM PIPES, &c.

No. 10.376. Reissued Aug. 28, 1883.

Witnesses.
Will R. Cruikshank Jr.
Willie Rossiter.

Inventor
James D. Pierce
By, Jno. G. Elliott
Atty

UNITED STATES PATENT OFFICE.

JAMES D. PIERCE, OF MILWAUKEE, WISCONSIN, ASSIGNOR, BY MESNE ASSIGNMENTS, TO SHIELDS & BROWN, OF CHICAGO, ILLINOIS.

COVERING FOR STEAM-PIPES, &c.

SPECIFICATION forming part of Reissued Letters Patent No. 10,376, dated August 28, 1883.

Original No. 252,400, dated January 17, 1882. Application for reissue filed July 17, 1883.

*To all whom it may concern:*

Be it known that I, JAMES D. PIERCE, a citizen of the United States, residing in Milwaukee, county of Milwaukee, and State of Wisconsin, have invented certain new and useful Improvements in Coverings for Steam-Pipes, Boilers, &c.; and I do hereby declare that the following is a full, clear, and exact description thereof.

My invention relates to coverings for pipes, boilers, &c., and will be fully described hereinafter.

Figure 1:
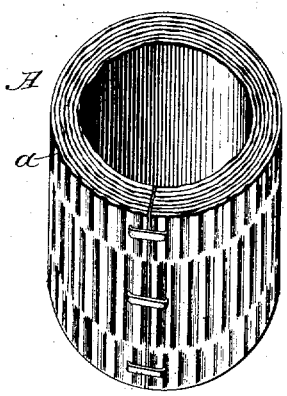
Figure 2:
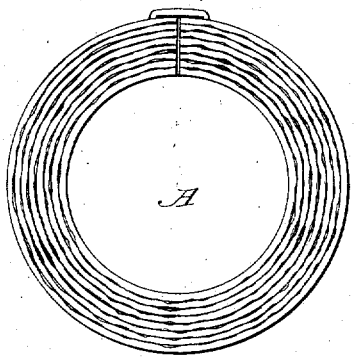
Figure 3:
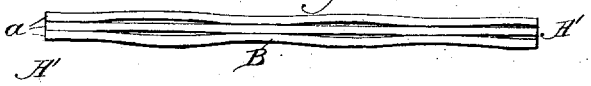
Figure 4:
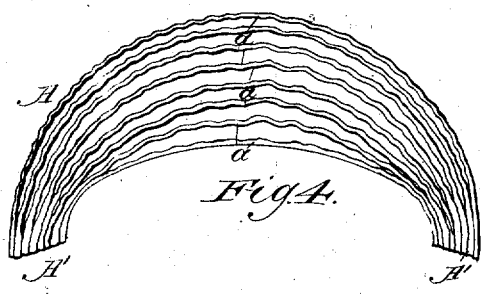

In the drawings, Figure 1 is a perspective view of a section of pipe-covering embodying my invention. Fig. 2 is an end view of the same; Fig. 3 is an edge view of a section of covering for flat surfaces, and Fig. 4 is an end view of a section of pipe-covering, the edges of which are spread apart.

Similar letters of reference indicate the same parts in the several figures of the drawings.

A represents a covering composed of two or more layers of paper *a*, which may be varied in number according to the thickness desired, and these layers may be either corrugated, indented, or plain. I make the pipe-covering by wrapping the paper about a mandrel and cementing or otherwise securing each layer to that immediately below it, as shown at A′ A′ A′ A′, Figs. 3 and 4, at intervals. The structure may now be cut open by a knife or saw through the center of the cemented line; and, the structure slipped off the mandrel, and as the edges of the layers of which it is composed are securely fastened together, it may be packed and transported without injury.

If my covering is designed for a flat surface, I merely secure flat layers of paper to each other in lines A′, and through these make the cuts which divide the covering into blocks or sheets.

As the layers which compose my improved covering are only secured together in lines, through which the dividing cuts are to be made, there will be left between the layers at other points (those between the secured portions) a great deal of space for non-circulating or dead air, and this gives to my covering, if corrugated or indented, a maximum power to resist the passage of heat through it, and if plain a resistance considerably above the maximum of a covering composed of layers secured together over substantially their entire surface.

I am aware that paper-covering has been made for pipes, &c.; but the layers of which this covering was composed were cemented to each other throughout the entire structure, and the covering was therefore so dense that its non-conducting properties were very greatly lessened.

My covering, except at the points A′, is as full of air-spaces, almost, as hair or sponge, and may be manufactured entirely at the shop, to be cut to the proper size either in the shops or wherever the covering is to be applied.

What I claim as my invention, and desire to secure by Letters Patent, is—

1. A covering for pipes, boilers, &c., consisting of layers of paper so secured together at intervals as to form air-spaces, substantially as set forth.

2. The method of preparing paper-coverings herein described—that is, placing layers of paper one upon the other, and securing them together at intervals as by pasting, so as to form intermediate air-spaces, and cutting through the pasted portions to divide the covering into blocks or sheets of the size required.

JAMES D. PIERCE.

Witnesses:
GEO. P. MILLER,
BENJ. K. MILLER, Jr.